United States Patent
Zhang et al.

(10) Patent No.: US 10,945,181 B2
(45) Date of Patent: Mar. 9, 2021

(54) AUTONOMOUS CONNECTION SWITCHING IN A WIRELESS COMMUNICATION NETWORK

(71) Applicant: Telefonaktiebolaget LM Ericsson (publ), Stockholm (SE)

(72) Inventors: Zhan Zhang, Beijing (CN); Jinhua Liu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/114,163

(22) PCT Filed: Jan. 30, 2014

(86) PCT No.: PCT/CN2014/071844
§ 371 (c)(1),
(2) Date: Jul. 26, 2016

(87) PCT Pub. No.: WO2015/113305
PCT Pub. Date: Aug. 6, 2015

(65) Prior Publication Data
US 2017/0238228 A1    Aug. 17, 2017

(51) Int. Cl.
*H04W 36/30*    (2009.01)
*H04W 36/08*    (2009.01)
(Continued)

(52) U.S. Cl.
CPC ....... *H04W 36/30* (2013.01); *H04W 36/0016* (2013.01); *H04W 36/0061* (2013.01);
(Continued)

(58) Field of Classification Search
None
See application file for complete search history.

(56) References Cited

U.S. PATENT DOCUMENTS 7,593,731 B2    9/2009    Lim et al.
7,920,868 B2    4/2011    Lim
(Continued)

FOREIGN PATENT DOCUMENTS

CN    1951035 A    4/2007
CN    101014183 A    8/2007
(Continued)

OTHER PUBLICATIONS

ETRI, "Early HO CMD with Ping-Pang Avoidance, further information", 3GPP TSG-RAN WG2 #84, San Francisco, USA, Nov. 11, 2013, pp. 1-10, R2-134177, 3GPP.
(Continued)

*Primary Examiner* — Robert C Scheibel
(74) *Attorney, Agent, or Firm* — Coats & Bennett, PLLC

(57) ABSTRACT

An access point (100-1) of a wireless communication network serves a connection to a user equipment (50). The access point (100-1) determines a plurality of target access points (100-2, 100-3). Further, the access point (100-1) sends a message (204) to the user equipment (50). The message (204) indicates the plurality of target access points (100-2, 100-3) and authorizes the user equipment (50) to autonomously switch the connection to one or more of the target access points (100-2, 100-3).

44 Claims, 7 Drawing Sheets

(51) Int. Cl.
*H04W 36/00* (2009.01)
*H04W 36/32* (2009.01)

(52) U.S. Cl.
CPC ....... *H04W 36/0072* (2013.01); *H04W 36/08* (2013.01); *H04W 36/32* (2013.01)

(56) References Cited

U.S. PATENT DOCUMENTS

| | | | |
|---|---|---|---|
| 9,781,635 B2* | 10/2017 | Sapiano | H04W 36/0016 |
| 2005/0026619 A1* | 2/2005 | Jha | H04W 36/32 |
| | | | 455/441 |
| 2005/0250498 A1* | 11/2005 | Lim | H04W 36/26 |
| | | | 455/436 |
| 2007/0086387 A1 | 4/2007 | Kang et al. | |
| 2007/0293224 A1 | 12/2007 | Wang et al. | |
| 2008/0318576 A1 | 12/2008 | So et al. | |
| 2010/0173626 A1 | 7/2010 | Catovic et al. | |
| 2010/0330993 A1* | 12/2010 | Kone | H04W 36/0055 |
| | | | 455/436 |
| 2011/0299505 A1* | 12/2011 | Unno | H04W 36/32 |
| | | | 370/331 |
| 2012/0088505 A1 | 4/2012 | Toh et al. | |
| 2012/0165065 A1 | 6/2012 | Sawada et al. | |
| 2013/0183971 A1* | 7/2013 | Tamaki | H04W 36/0061 |
| | | | 455/436 |
| 2014/0023045 A1* | 1/2014 | Li | H04W 36/0055 |
| | | | 370/331 |
| 2014/0045494 A1* | 2/2014 | Pekonen | H04W 36/0005 |
| | | | 455/434 |
| 2015/0079991 A1* | 3/2015 | Koskinen | H04W 36/0083 |
| | | | 455/436 |
| 2015/0133121 A1* | 5/2015 | Li | H04W 36/0058 |
| | | | 455/436 |
| 2015/0304921 A1* | 10/2015 | Hong | H04W 36/08 |
| | | | 455/436 |
| 2015/0373596 A1* | 12/2015 | Yiu | H04W 74/02 |
| | | | 370/332 |
| 2016/0021585 A1* | 1/2016 | Pedersen | H04W 36/0083 |
| | | | 370/331 |
| 2016/0302127 A1* | 10/2016 | Moon | H04W 76/028 |
| 2016/0337065 A1* | 11/2016 | Yokomakura | H04L 1/0003 |
| 2017/0238228 A1 | 8/2017 | Zhang | |

FOREIGN PATENT DOCUMENTS

| | | |
|---|---|---|
| CN | 101374326 A | 2/2009 |
| CN | 102857983 A | 1/2013 |
| EP | 2696624 A1 | 2/2014 |
| JP | 2007536784 A | 12/2007 |
| JP | 2010531124 A | 9/2010 |
| JP | 2012514949 A | 6/2012 |
| KR | 2012058120 A | 6/2012 |
| WO | 2009096883 A1 | 8/2009 |
| WO | 2011032499 A1 | 3/2011 |
| WO | 2010109591 A1 | 9/2012 |
| WO | 2010143428 A1 | 11/2012 |
| WO | 2011014655 A1 | 1/2013 |
| WO | 2011024655 A1 | 1/2013 |
| WO | 2013177778 A1 | 12/2013 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.0.0, Dec. 1, 2013, pp. 1-349, 3GPP, France.

Ericsson, "5G Radio Access", Ericsson white paper, Jun. 1, 2013, pp. 1-9.

Baldemair, R. et al., "Future Wireless Communications", IEEE 77th Vehicular Technology Conference, Jun. 2, 2013, pp. 1-5.

NSN et al., "Autonomous SCell Management for Dual Connectivity Cases", 3GPP TSG-RAN WG2 Meeting #83, Aug. 19-23, 2013, pp. 1-4, Barcelona, Spain, R2-132339.

* cited by examiner

AUTONOMOUS CONNECTION SWITCHING IN A WIRELESS COMMUNICATION NETWORK

TECHNICAL FIELD

The present invention relates to methods for managing a connection between a user equipment and a wireless communication network and to corresponding devices.

BACKGROUND

For cellular networks, e.g., as specified by 3GPP ($3^{rd}$ Generation Partnership Project), handover (HO) procedures are defined which allow for maintaining an ongoing connection of a user equipment (UE) while moving between different serving cells.

For example, in the case of the LTE (Long Term Evolution) technology, such HO procedures are specified in 3GPP TS 36.331 V12.0.0 (2014 January). In these HO procedures, the UE which is in a mode referred to as "RRC_connected", i.e., has an active connection to the cellular network, typically monitors a set of neighboring cells. These measurements may trigger sending of a measurement report from the UE to its serving base station, in the LTE technology referred to as eNB (evolved Node B). A typical example of such triggering event, referred to as "Event A3", corresponds to the measurement result for the neighboring cell being better than the present serving cell plus an offset. The measurement result may for example be expressed in terms of Reference Signal Received Power (RSRP) or Reference Signal Received Quality (RSRQ). The triggering event further requires that such condition is met for a certain minimum duration, specified by a parameter referred to as "timeToTrigger". On the basis of the measurement report, the serving eNB decides whether a HO of the UE should be performed or not. When deciding to perform a HO of the UE, the serving eNB prepares the HO by sending a HO request to an eNB controlling a target cell for the HO. As a part of this HO request, the serving eNB also provides context information of the UE, e.g., concerning a current Access Stratum (AS) configuration and UE-specific Radio Resource Management (RRM) information. In response, the eNB controlling the target cell generates a HO command. The serving eNB then forwards the HO command to the UE. This is done in a transparent manner, i.e., the information provided to the UE is determined at the eNB controlling the target cell and not modified by the serving eNB. The HO command which is sent to the UE for example includes the identity, and optionally the frequency, of the target cell and RRC information common to all UEs in the target cell, such as information required to perform a random access, a dedicated radio resource configuration; a security configuration, or a cell-specific radio network temporary identity (C-RNTI) to be used in the target cell. Using such information, the UE may then proceed by performing a random access to the target cell. If the random access is successful, the UE confirms successful completion of the HO to the eNB controlling the target cell, which then becomes the new serving eNB for the UE.

In some scenarios, a network initiated HO may also be performed without a preceding Event A3 and measurement report from the UE. In such a case, the UE does not know the target cell before receiving the HO command from the serving eNB.

As can be seen, the above-mentioned known HO procedure requires rather complex interaction between the serving eNB, the eNB controlling the target cell, and the UE, which means that such a HO can be time consuming.

To meet future demands on wireless communication networks, a network deployment referred to as Ultra Dense Network (UDN) is being discussed (see, e.g., Ericsson White Paper "5G Radio Access", June 2013, published in the Internet). For such a UDN it is suggested to use a large number of densely deployed access points (APs) and to utilize higher bandwidths and higher frequency bands than for example in the LTE technology, e.g., a bandwidth of several 100 MHz or even up to the GHz range and a frequency band in the range of 10-100 GHz.

A typical application scenario for a UDN deployment is in highly populated areas such as hot spots, office buildings, or urban centers, which may have a demand of high data rate service.

However, it can be expected that for such UDN deployment in a high frequency band weak scattering and diffraction may cause a significant attenuation difference between NLOS (non line of sight) and LOS (line of sight) radio links. Consequently, there may be a lot of areas with weak signal levels or even sudden signal outage, i.e., radio coverage holes. Accordingly, existing mobility concepts may not be adequate for such deployments. For example, the higher density of APs may result in an excessive amount of HO procedures and unacceptable signalling overhead or service degradation. Further, a sudden signal outage may even have the effect that a conventional network-initiated HO procedure as mentioned above cannot be performed, e.g., because the signal outage prevents the UE from sending the measurement report or receiving the HO command.

Accordingly, there is a need for techniques which allow for efficiently managing the connection of a UE to a wireless communication network.

SUMMARY

According to an embodiment of the invention, a method of managing a connection between a UE and a wireless communication network is provided. According to the method, an access point of the communication network serves the connection to the UE. The access point determines a plurality of target access points. Further, the access point sends a message to the UE. The message indicates the plurality of target access points and authorizes the UE to autonomously switch the connection to one or more of the target access points.

According to a further embodiment of the invention, a method of managing a connection between a UE and a wireless communication network is provided. According to the method, a UE receives a message from an access point of the communication network, which access point currently serves the connection of the UE to the wireless communication network. The message indicates a plurality of target access points and authorizes the UE to autonomously switch the connection to one or more of the indicated target access points. According to the method, the UE further detects a triggering event. In response to detecting the triggering event, the UE switches the connection to one or more of the target access points.

According to a further embodiment of the invention, an access point for a wireless communication network is provided. The access point comprises radio interface for serving a connection to a UE. Further, the access point comprises at least one processor. The at least one processor is configured to determine a plurality of target access points. Further, the at least one processor is configured to send a message to the UE. The message indicates the plurality of target access points and authorizes the UE to autonomously switch the connection to one or more of the target access points.

According to a further embodiment of the invention, a UE is provided. The UE comprises a radio interface for establishing a connection to a wireless communication network. Further, the UE comprises at least one processor. The at least one processor is configured to receive a message from an access point of the communication network, which access point currently serves the connection of the UE to the wireless communication network. The message indicates a plurality of target access points and authorizes the UE to autonomously switch the connection to one or more of the indicated target access points. Further, the at least one processor is configured to detect a triggering event and, in response to detecting the triggering event, switch the connection to one or more of the target access points.

According to a further embodiment of the invention, a computer program or computer program product is provided, e.g., in the form of a non-transitory storage medium, which comprises program code to be executed by at least one processor of an access point for a wireless communication network. Execution of the program code causes the at least one processor to determine a plurality of target access points. Further, execution of the program code causes the at least one processor to send a message to the UE. The message indicates the plurality of target access points and authorizes the UE to autonomously switch the connection to one or more of the target access points.

According to a further embodiment of the invention, a computer program or computer program product is provided, e.g., in the form of a non-transitory storage medium, which comprises program code to be executed by at least one processor of a UE. Execution of the program code causes the at least one processor to receive a message from an access point of the communication network, which access point currently serves the connection of the UE to the wireless communication network. The message indicates a plurality of target access points and authorizes the UE to autonomously switch the connection to one or more of the indicated target access points. Further, execution of the program code causes the at least one processor to detect a triggering event and, in response to detecting the triggering event, switch the connection to one or more of the target access points.

DETAILED DESCRIPTION OF EMBODIMENTS

In the following, concepts according to embodiments of the invention will be explained in more detail by referring to the accompanying drawings. The illustrated concepts relate to management of connection switching in a wireless communication network. In the illustrated embodiments, it is assumed that the wireless communication network is based on a UDN deployment. In particular, the wireless communication network may use densely spaced access points, e.g., with distances between neighboring access points in the range of 1 m to 1000 m, typically in the range of 2 m to 500 m. Further, the access points may operate in a radio frequency band between 10 GHz and 100 GHz, which means that there can be a significant difference in link quality between a LOS link and a NLOS link. However, it is to be understood that the illustrated concepts could be applied in a corresponding manner to other radio technologies, e.g., LTE, UMTS (Universal Terrestrial Mobile Telecommunications System) or Wideband CDMA (Code Division Multiple Access), or CDMA2000.

Figure 1:
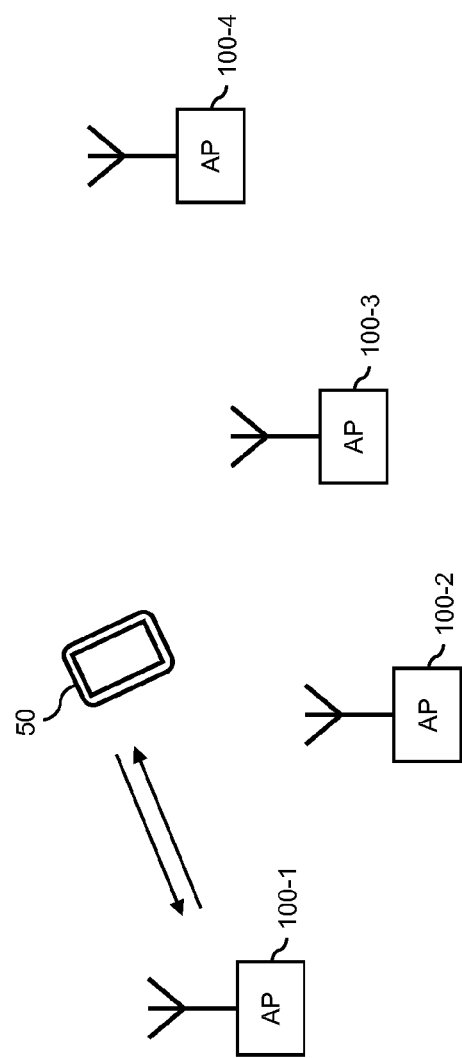
FIG. 1 schematically illustrates a network deployment for implementing autonomous connection switching in accordance with an embodiment of the invention.

FIG. 1 schematically illustrates structures of the wireless communication network and an exemplary UE 50. In particular, FIG. 1 illustrates a plurality of access points 100-1, 100-2, 100-3, 100-4 of the wireless communication network, which may be used by the UE 50 for connecting to the wireless communication network. Here, it should be noted that a connection between the UE 50 and the wireless communication network may be formed by selecting an appropriate access point 100-1, 100-2, 100-3, 100-4 and setting up a radio link between the UE 50 and this access point 100-1, 100-2, 100-3, 100-4. In the exemplary scenario illustrated in FIG. 1, the connection is formed by a radio link to the access point 100-1. This access point 100-1, which maintains the active connection between the UE 50 and the wireless communication network, may also be referred to as serving access point of the UE 50. In some cases, a connection may also utilize multiple radio links to different access points 100-1, 100-2, 100-3, 100-4, which may then cooperatively serve the UE 50.

As mentioned above, the wireless communication network may utilize a high frequency band in the range of 10 GHz to 100 GHz, in particular a frequency band above 30 GHz, such as in the range around 60 GHz. This frequency region above 30 GHz is also referred to as MMW (Millimetre Wave) band.

In such high frequency band, relatively high radio attenuation and relatively low radio diffraction have the effect that typically a LOS radio link will have significantly better quality than a NLOS radio link. However, since a LOS radio link radio link is sensitive to propagation obstacles, fast switching of the connection between different access points 100-1, 100-2, 100-3, 100-4, may be necessary to maintain the connection. For example, due to movement of the UE 50 an obstacle may affect the LOS radio link to the access point 100-1, which means that switching of the connection to another access point 100-2, 100-3, 100-3, 100-4 is needed. Similar effects may occur in the case of moving propagation obstacles, e.g., a person moving into the LOS between the UE 50 and the current serving access point 100-1. Because the transition from a LOS condition to a NLOS condition may occur suddenly, there is a risk of a sudden failure of the radio link to the current serving access point 100-1. This may in turn have the effect that the UE 50 is no longer able to report measurements to the serving access point 100-1 and that the serving access point 100-1 is not able to send control commands to the UE 50. Accordingly, a conventional HO procedure as for example described in 3GPP TS 36.331 may not be applicable in these circumstances.

According to the concepts as further explained in the following, the above situation may be addressed by managing the switching of the connection between the access points 100-1, 100-2, 100-3, 100-4, in such a way that it can be autonomously performed by the UE 50. For this purpose, the current serving access point 100-1 may proactively send a message to the UE 50 for authorizing the UE 50 to autonomously switch the connection to one or more target access points indicated in the message. Accordingly, the overall management of the connection is still network based, but the actual switching process may be performed autonomously by the UE 50. In the following, the above message will also be referred to as switching authorization message. The switching authorization message may be sent at an early point of time, before switching of the connection to another access point becomes necessary and while the radio link to the current serving access point 100-1 is still intact. The switching authorization message may also include information with respect to the different indicated target access points to be used be the UE 50 when switching the connection to one or more of these target access points. For example, such information may include configurations of the target access points, switching conditions, usable radio resources, configurations to be used by the UE 50 to access the target access points, or the like. The UE 50 may then decide whether and when to perform the switching and also select the most appropriate target access point(s) from the indicated target access points. This is accomplished in an autonomous manner, i.e., without requiring further interaction between the UE 50 and the current serving access point 100-1. Accordingly, fast switching of the connection is also possible in situations where the radio link to the current serving access point 100-1 fails. In this way, the illustrated concepts may allow for avoiding a service interruption due to a complete failure of the ongoing connection.

Various conditions may be evaluated by the current serving access point for triggering sending of the switching authorization message. For example, the current serving access point may perform measurements and trigger sending of the switching authorization message depending on these measurements. Such measurements may for example pertain to the quality of the radio link between the UE 50 and the current serving access point 100-1 or to the velocity at which the UE 50 moves.

Figure 2:
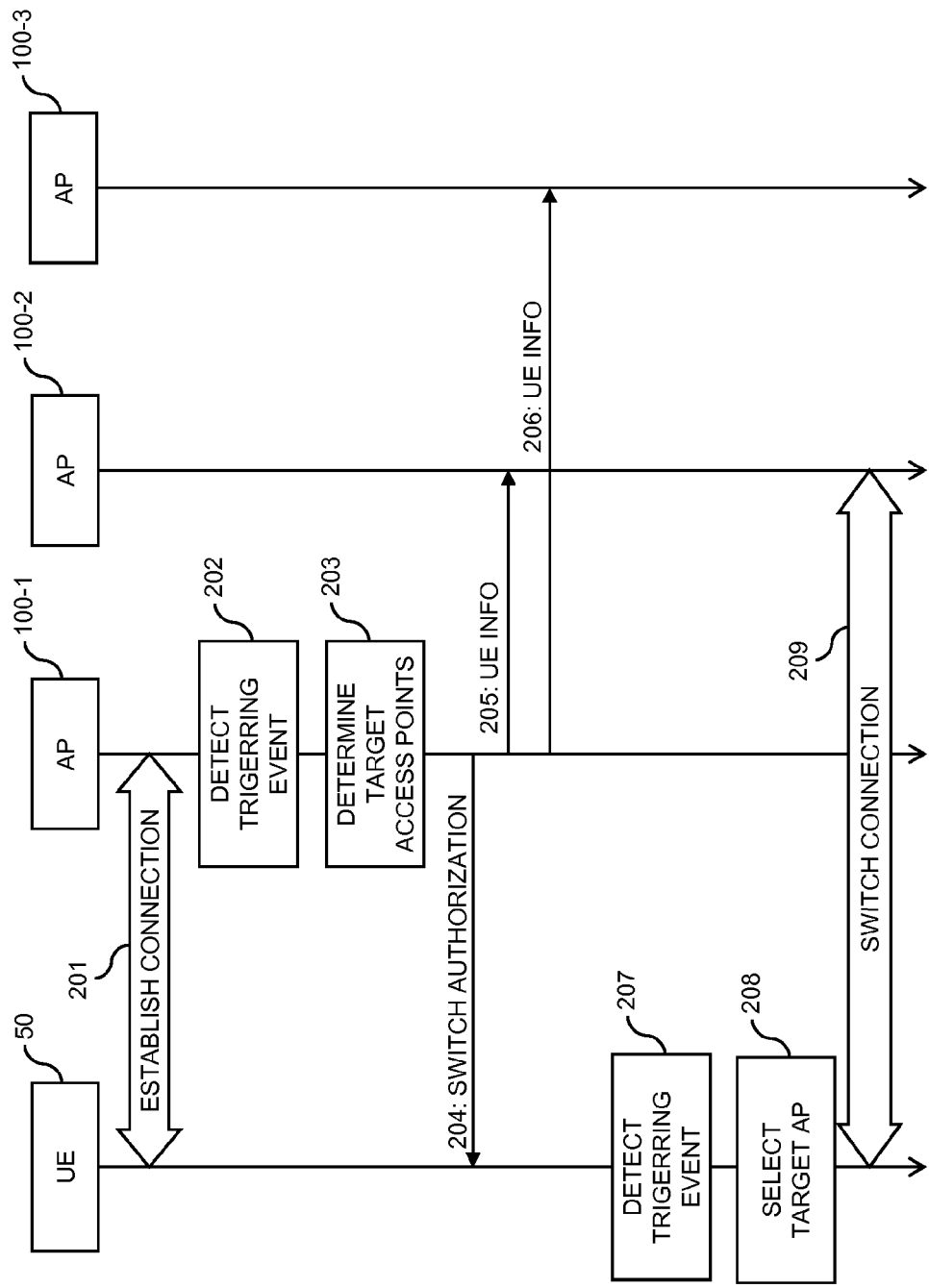
FIG. 2 shows a signaling diagram for illustrating an exemplary connection switching procedure in accordance with an embodiment of the invention.

FIG. 2 further illustrates the above concepts by referring to an exemplary procedure of switching the connection of the UE 50 from the current serving access point 100-1 to another access point 100-2.

In the procedure of FIG. 2, the connection between the UE 50 and the wireless communication network is established at step 201. As illustrated, the connection is established by setting up a radio link between the UE 50 and the access point 100-1. The access point 100-1 thus becomes the serving access point for the UE 50.

At step 202, the access point 100-1 detects a triggering event. The triggering event may for example correspond to the establishment of the connection at step 201. Further, the triggering event may be based on certain measurements and/or evaluations performed by the access point 100-1. For example, the access point 100-1 could measure and evaluate the quality of the radio link between the UE 50 and the access point 100-1, e.g., in terms of a channel quality indicator, beacon power level, or achievable bitrate. The triggering event could then correspond to the quality of the radio link being below a given threshold value. Further, the access point 100-1 could determine a probability of a failure of the radio link between the UE 50 and the access point 100-1. For example, this could be accomplished on the basis of statistical information on radio coverage holes in a radio coverage area of the access point 100-1 and on information on the position or movement of the UE 50. Further, the access point 100-1 could measure a velocity of the UE 50, e.g., by evaluating radio signals transmitted by the UE 50, and the triggering event could correspond to the velocity of the UE 50 exceeding a given threshold value. In this case, it can be taken into account that a fast moving UE is more likely to require switching to another access point than a slowly moving or static UE. Further, the access point 100-1 may evaluate whether a switching authorization message which was previously sent to the UE 50 is still valid or outdated and trigger sending the switching authorization message when the previously sent switching authorization message is no longer valid. This may for example be accomplished by providing a timer which is reset each time when the access point 100-1 sends a new switching authorization message to the UE 50 and using expiry of the timer as the triggering event.

At step 203, the access point 100-1 determines a plurality of target access points which constitute candidates to which the connection between the UE 50 and the wireless communication network may be switched. In the illustrated exemplary procedure, it is assumed that these target access points are the access points 100-2 and 100-3. The access point 100-1 may apply various criteria for determining the target access points 100-2, 100-3. For example, the access point 100-1 may select access points which are located in a moving direction of the UE 50 or access points which provide radio coverage in radio known coverage holes in the coverage area of the access point 100-1.

The access point 100-1 then sends the switching authorization message 204 to the UE 50. This may be accomplished over a control channel supported by the radio link between the UE 50 and the access point 100-1. The switching authorization message indicates the target access points 100-2, 100-3 determined at step 203. Further, the switching authorization message 204 authorizes the UE 50 to autonomously switch the ongoing connection to one or more of the target access points 100-2, 100-3 indicated in the switching authorization message 204, without requiring further interaction between the UE 50 and the access point 100-1.

The switching authorization message 204 may carry various kinds of information which may be used by the UE 50 for performing the autonomous switching of the connection. For example, the switching authorization message 204 may indicate one or more conditions for triggering the switching at the UE 50. Such condition may for example correspond to measurements performed by the UE 50 indicating that the expected radio link quality of one of the target access points 100-2, 100-3 exceeds the radio link quality of the current serving access point 100-1 by a given amount. Further, such condition may correspond to measurements performed by the UE 50 indicating that the radio link quality of the current serving access point 100-1 is below a first threshold and the expected radio link quality of one of the target access points 100-2, 100-3 is above a second threshold. As a further example, such condition may correspond to a failure of the radio link to the current serving access point 100-1 or interruption of the connection.

Further, the switching authorization message 204 may indicate information concerning each of the indicated target access points 100-2, 100-3. For example, such information may include an identity of the target access point 100-2, 100-3, e.g., in terms of an index. Further, such information may include a sequence, timing, and/or radio resources used for a beacon or pilot signal transmitted by the target access point 100-2, 100-3. Further, information concerning communication protocols used by the target access point may be included. Such protocol information may in particular be useful if the access points 100-1, 100-2, 100-2, 100-3, 100-4, differ with respect to the utilized radio access technology. Further, such information may include a radio resource mapping of a control channel of the target access point 100-2, 100-3. Further, such information may indicate the radio access technology used by the target access point 100-2, 100-3. Further, such information may include system information for accessing the target access point 100-2, 100-3, e.g., in the form of a random access preamble or in terms of a cell-specific temporary identifier (e.g., a C-RNTI) to be used by the UE 50.

Still further, the switching authorization message 204 may include information to be applied by the UE 50 for selecting between the different target access points 100-2, 100-3 indicated in the switching authorization message 204, e.g., in the form of a priority order or selection policy.

The switching authorization message 204 may be valid for a given time period. Such time period may be preconfigured in the UE 50 and the access points 100-1, 100-2, 100-3, 100-4 of the wireless communication network. Further, such time period may be dynamically set for each switching authorization message. In the illustrated exemplary procedure, the access point 100-1 could set the time period before sending the switching authorization message 204 and indicate the time period in the switching authorization message 204. The UE 50 is then authorized to autonomously perform the switching while the time period has not yet expired. Expiry of the time period may be monitored by providing a corresponding timer in the UE 50. The access point 100-1 may set the time period for example depending on the current velocity of the UE 50. For example, if the UE 50 is moving at high velocity, a shorter time period may be suitable. In certain cases, the switching authorization message 204 could also be valid until a specified event, e.g., receipt of a new switching authorization message or release of the connection between the UE 50 and the wireless communication network. In certain scenarios, the switching authorization message 204 may override a previously sent switching authorization message or may be overridden by a later sent switching authorization message.

In addition to sending the switching authorization message 204, the access point 100-1 also provides information concerning the UE 50 to the target access points 100-2, 100-3 determined at step 203, as illustrated by messages 205 and 206. Such information may for example include a context of the UE 50 as provided for maintaining the connection between the UE 50 and the wireless communication network. In addition, the access point 100-1 may also start forwarding user plane data destined to the UE 50 to the target access points 100-2, 100-3. In this way, the target access points 100-2, 100-3 may be prepared to immediately continue serving the UE 50 after switching the connection. The information provided to the target access points 100-2, 100-3 may also indicate the validity time period of the switching authorization message 204. Here, it may be beneficial to indicate a validity time period to the target access points which is larger than the validity time period applied by the UE 50, thereby ensuring that the target access points 100-2, 100-3 are prepared also in cases where the UE 50 attempts switching of the connection at the very end of the validity time period indicated to the UE 50. If the access point 100-1 has determined a priority order of the target access points 100-2, 100-3, the access point 100-1 may send the information to the different target access points 100-2, 100-3 in the order of decreasing priority.

Upon receiving the switching authorization message 204, the UE 50 may start monitoring procedures with respect to the target access points 100-2, 100-3 indicated in the switching authorization message 204. For example, the UE 50 may perform measurements to determine which of the indicated target access points 100-2, 100-3 provides the highest expected radio link quality. After such determination, the UE 50 may continue monitoring only the target access point 100-2, 100-3 with the highest expected radio link quality. In other scenarios, the UE 50 may continue to monitor all the indicated target access points 100-2, 100-3. The monitoring may use information provided in the switching authorization message 204, e.g., sequence, timing, and/or radio resources used for a beacon or pilot signal transmitted by the target access point 100-2, 100-3.

However, the UE 50 performs no immediate switching of the connection. Rather, the UE 50 performs switching of the connection action only in response to detecting a triggering event, as illustrated by step 207. Such triggering event may be preconfigured in the UE 50 or may be indicated in the switching authorization message 204. For example, the triggering event may correspond to a failure of the radio link between the UE 50 and the current serving access point 100-1. Further, such triggering event may correspond to measurements performed by the UE 50 indicating that the expected radio link quality of one of the target access points 100-2, 100-3 exceeds the radio link quality of the current serving access point 100-1 by a given amount. Further, such triggering event may correspond to measurements performed by the UE 50 indicating that the radio link quality of the current serving access point 100-1 is below a first threshold and the expected radio link quality of one of the target access points 100-2, 100-3 is above a second threshold.

In response to detecting the triggering event at step 207, the UE 50 initiates switching of the connection to one of the target access points 100-2, 100-3 indicated in the switching authorization message 204. For this purpose, the UE 50 may also select between the indicated target access points 100-2, 100-3, as indicated by step 208. For example, the UE 50 may select the target access point 100-2, 100-3 which provides the highest expected radio link quality. In the illustrated exemplary procedure, it is assumed that the UE 50 selects the target access point 100-2. As illustrated by step 209, the UE 50 then performs the switching of the connection by setting up a new radio link to the target access point 100-2 selected at step 208, which then becomes the new serving access point for the UE 50.

Figure 3:
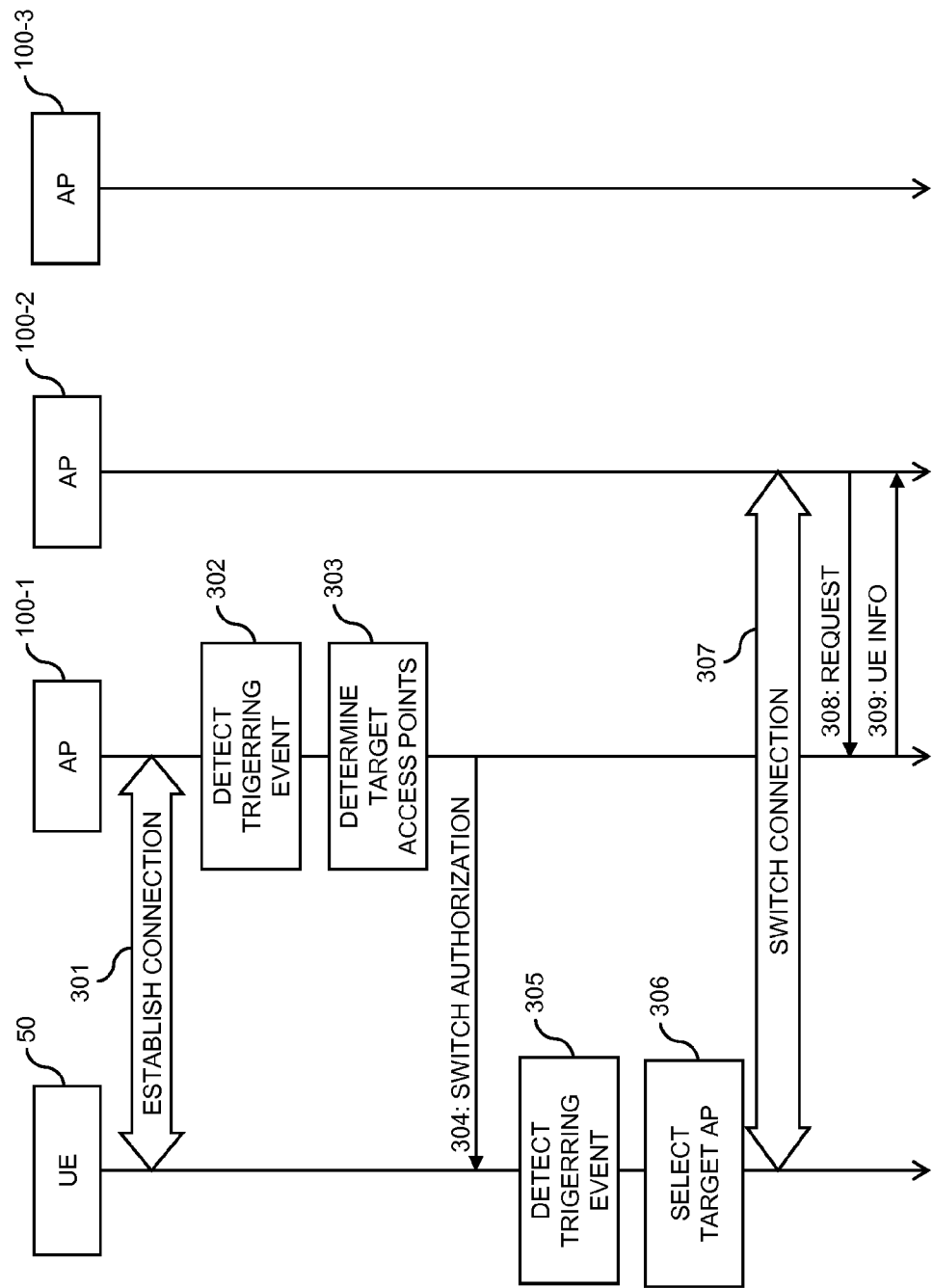
FIG. 3 shows a signaling diagram for illustrating a further exemplary connection switching procedure according to an embodiment of the invention.

FIG. 3 illustrates a further exemplary procedure of switching the connection of the UE 50 from the current serving access point 100-1 to another access point 100-2. The procedure of FIG. 3 is in many aspects similar to that of FIG. 2. However, in the procedure of FIG. 3 a different process is used for providing the target access point 100-2 with information concerning the UE 50.

In the procedure of FIG. 3, the connection between the UE 50 and the wireless communication network is established at step 301. As illustrated, the connection is established by setting up a radio link between the UE 50 and the access point 100-1. The access point 100-1 thus becomes the serving access point for the UE 50.

At step 302, the access point 100-1 detects a triggering event. The triggering event may for example correspond to the establishment of the connection at step 301. Further, the triggering event may be based on certain measurements and/or evaluations performed by the access point 100-1. For example, the access point 100-1 could measure and evaluate the quality of the radio link between the UE 50 and the access point 100-1, e.g., in terms of a channel quality indicator, beacon power level, or achievable bitrate. The triggering event could then correspond to the quality of the radio link being below a given threshold value. Further, the access point 100-1 could determine a probability of a failure of the radio link between the UE 50 and the access point 100-1. For example, this could be accomplished on the basis of statistical information on radio coverage holes in a radio coverage area of the access point 100-1 and on information on the position or movement of the UE 50. Further, the access point 100-1 could measure a velocity of the UE 50, e.g., by evaluating radio signals transmitted by the UE 50, and the triggering event could correspond to the velocity of the UE 50 exceeding a given threshold value. In this case, it can be taken into account that a fast moving UE is more likely to require switching to another access point than a slowly moving or static UE. Further, the access point 100-1 may evaluate whether a switching authorization message which was previously sent to the UE 50 is still valid or outdated and trigger sending the switching authorization message when the previously sent switching authorization message is no longer valid. This may for example be accomplished by providing a timer which is reset each time when the access point 100-1 sends a new switching authorization message to the UE 50 and using expiry of the timer as the triggering event.

At step 303, the access point 100-1 determines a plurality of target access points which constitute candidates to which the connection between the UE 50 and the wireless communication network may be switched. In the illustrated exemplary procedure, it is assumed that these target access points are the access points 100-2 and 100-3. The access point 100-1 may apply various criteria for determining the target access points 100-2, 100-3. For example, the access point 100-1 may select access points which are located in a moving direction of the UE 50 or access points which provide radio coverage in radio known coverage holes in the coverage area of the access point 100-1.

The access point 100-1 then sends the switching authorization message 304 to the UE 50. This may be accomplished over a control channel supported by the radio link between the UE 50 and the access point 100-1. The switching authorization message 304 indicates the target access points 100-2, 100-3 determined at step 303. Further, the switching authorization message 304 authorizes the UE 50 to autonomously switch the ongoing connection to one or more of the target access points 100-2, 100-3 indicated in the switching authorization message 304, without requiring further interaction between the UE 50 and the access point 100-1.

The switching authorization message 304 may carry various kinds of information which may be used by the UE 50 for performing the autonomous switching of the connection. For example, the switching authorization message 304 may indicate one or more conditions for triggering the switching at the UE 50. Such condition may for example correspond to measurements performed by the UE 50 indicating that the expected radio link quality of one of the target access points 100-2, 100-3 exceeds the radio link quality of the current serving access point 100-1 by a given amount. Further, such condition may correspond to measurements performed by the UE 50 indicating that the radio link quality of the current serving access point 100-1 is below a first threshold and the expected radio link quality of one of the target access points 100-2, 100-3 is above a second threshold. As a further example, such condition may correspond to a failure of the radio link to the current serving access point 100-1 or an interruption of the connection.

Further, the switching authorization message 304 may indicate information concerning each of the indicated target access points 100-2, 100-3. For example, such information may include an identity of the target access point 100-2, 100-3, e.g., in terms of an index. Further, such information may include a sequence, timing, and/or radio resources used for a beacon or pilot signal transmitted by the target access point 100-2, 100-3. Further, information concerning communication protocols used by the target access point 100-2, 100-3 may be included. Such protocol information may in particular be useful if the access points 100-1, 100-2, 100-2, 100-3, 100-4 differ with respect to the utilized radio access technology. Further, such information may include a radio resource mapping of a control channel of the target access point 100-2, 100-3. Further, such information may indicate the radio access technology used by the target access point 100-2, 100-3. Further, such information may include system information for accessing the target access point 100-2, 100-3, e.g., in the form of a random access preamble or in terms of a cell-specific temporary identifier (e.g., a C-RNTI) to be used by the UE 50.

Still further, the switching authorization message 304 may include information to be applied by the UE 50 for selecting between the different target access points 100-2, 100-3 indicated in the switching authorization message 304, e.g., in the form of a priority order or selection policy.

The switching authorization message 304 may be valid for a given time period. Such time period may be preconfigured in the UE 50 and the access points 100-1, 100-2, 100-3, 100-4, 100-5 of the wireless communication network. Further, such time period may be dynamically set for each switching authorization message. In the illustrated exemplary procedure, the access point 100-1 could set the time period before sending the switching authorization message 304 and indicate the time period in the switching authorization message 304. The UE 50 is then authorized to autonomously perform the switching while the time period has not yet expired. Expiry of the time period may be monitored by providing a corresponding timer in the UE 50. The access point 100-1 may set the time period for example depending on the current velocity of the UE 50. For example, if the UE 50 is moving at high velocity, a shorter time period may be suitable. In certain cases, the switching authorization message 304 could also be valid until a specified event, e.g., receipt of a new switching authorization message or release of the connection between the UE 50 and the wireless communication network. In certain scenarios, the switching authorization message 304 may override a previously sent switching authorization message or may be overridden by a later sent switching authorization message.

Upon receiving the switching authorization message 304, the UE 50 may start monitoring procedures with respect to the target access points 100-2, 100-3 indicated in the switching authorization message 304. For example, the UE 50 may perform measurements to determine which of the indicated target access points 100-2, 100-3 provides the highest expected radio link quality. After such determination, the UE 50 may continue monitoring only the target access point 100-2, 100-3 with the highest expected radio link quality. In other scenarios, the UE 50 may continue to monitor all the indicated target access points 100-2, 100-3. The monitoring may use information provided in the switching authorization message 304, e.g., sequence, timing, and/or radio resources used for a beacon or pilot signal transmitted by the target access point 100-2, 100-3.

However, the UE 50 performs no immediate switching of the connection. Rather, the UE 50 performs switching of the connection action only in response to detecting a triggering event, as illustrated by step 305. Such triggering event may be preconfigured in the UE 50 or may be indicated in the switching authorization message 304. For example, the triggering event may correspond to a failure of the radio link between the UE 50 and the current serving access point 100-1. Further, such triggering event may correspond to measurements performed by the UE 50 indicating that the expected radio link quality of one of the target access points 100-2, 100-3 exceeds the radio link quality of the current serving access point 100-1 by a given amount. Further, such triggering event may correspond to measurements performed by the UE 50 indicating that the radio link quality of the current serving access point 100-1 is below a first threshold and the expected radio link quality of one of the target access points 100-2, 100-3 is above a second threshold.

In response to detecting the triggering event at step 305, the UE 50 initiates switching of the connection to one of the target access points 100-2, 100-3 indicated in the switching authorization message 304. For this purpose, the UE 50 may also select between the indicated target access points 100-2, 100-3, as indicated by step 306. For example, the UE 50 may select the target access point 100-2, 100-3 which provides the highest expected radio link quality. In the illustrated exemplary procedure, it is assumed that the UE 50 selects the target access point 100-2. As illustrated by step 307, the UE 50 then performs the switching of the connection by setting up a new radio link to the target access point 100-2 selected at step 306, which then becomes the new serving access point for the UE 50.

When switching the connection at step 307, the UE 50 also indicates an identity of the previous serving access point 100-1, e.g., in terms of an index, to the new serving access point 100-2. The new serving access point 100-2 may then use this identity to send a request 308 for information concerning the UE 50 to the previous serving access point 100-1.

In response to the request 308, the access point 100-1 provides information concerning the UE 50 to the new serving access point 100-2, as illustrated by message 309. Such information may for example include a context of the UE 50 as provided for maintaining the connection between the UE 50 and the wireless communication network.

The connection switching procedures as explained above may also be used together with other kinds of connection switching procedures, e.g., a connection switching procedure in which the UE 50 is instructed by the current serving access point to immediately switch to a certain target access point. In such cases, the autonomous switching procedure could be used as a backup for cases where an instruction for immediate switching is not possible, e.g., due to a failure of the radio link between the UE 50 and the current serving access point. Accordingly, if the UE 50 first receives the switching authorization message and then a command for immediate switching of the connection, the UE 50 may first attempt to perform the immediate switching and, if this immediate switching fails, continue with the autonomous switching procedure.

Figure 4:
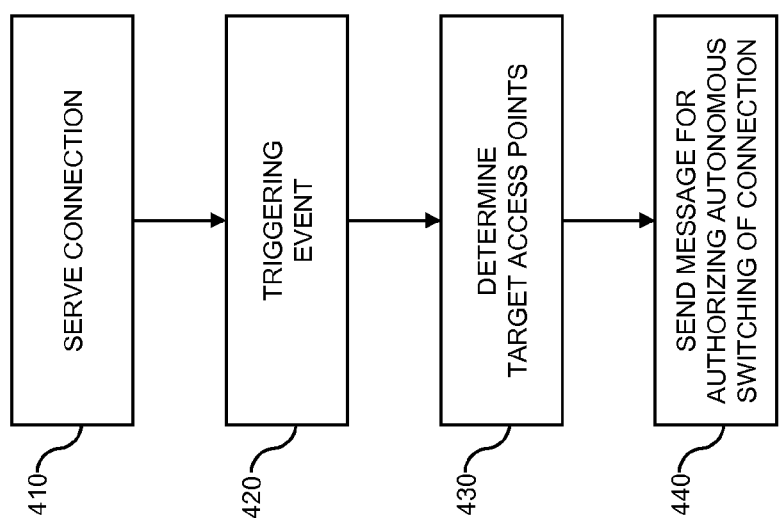
FIG. 4 shows a flowchart for illustrating a method according to an embodiment of the invention, which may be used for implementing functionalities for connection switching according to an embodiment of the invention in an access point.

FIG. 4 shows a flowchart for illustrating a method which may be used for implementing the above concepts in an access node of a wireless communication network, e.g., in one of the access nodes 100-1, 100-2, 100-3, 100-4. If a processor based implementation of the access point is used, the steps of the method may be performed by one or more processors of the access point. For this purpose, the processor(s) may execute correspondingly configured program code. Further, at least some of the corresponding functionalities may be hardwired in the processor(s).

At step 410, the access point serves a connection between a UE, e.g., the UE 50, and the wireless communication network. The connection is based on a radio link between the UE and the access point. In some scenarios, the connection may further be based on additional radio links between the UE and other access points.

At step 420, the access point detects a triggering event. Various kinds of triggering events may be used. For example, the access point may send the message in response to establishing the connection between the UE and the communication network. Further, the access point may determine a failure probability of a radio link between the UE and the access point and send the message in response to the failure probability being above a threshold. Further, the access point may measure a quality of a radio link between the user equipment and the access point and send the message in response to the quality of the radio link being below a threshold. Further, the access point may measure a velocity of the UE and send the message in response to the velocity being above a threshold. Further, the access point may send the message in response to determining that a further plurality of target access points, which was previously indicated to the user equipment, is no longer valid. In the exemplary procedures of FIGS. 2 and 3 this is accomplished by considering the validity time period of the switching authorization message.

At step 430, the access point determines a plurality of target access points. This determination may for example be based on measurements performed by the access point.

At step 440, the access point sends a message to the UE. The message indicates the target access points determined at step 430 and authorizes the UE to autonomously switch the connection to one or more of the target access points. As explained above, this autonomous switching does not require further interaction between the UE and the access point. The above-mentioned switching authorization messages 204 and 304 are examples of such message.

The message may further indicate a condition to be evaluated by the UE for triggering the switching to said one or more of the target access points. For example, such condition may be based on measurements performed by the UE, e.g., to determine a radio link qualities.

For example, the switching may be triggered when a radio link quality expected for one of the target access points exceeds a radio link quality of the access point by a given amount. Further, the switching may be triggered when a radio link quality expected for one of the target access points is above a first threshold and a radio link quality of the access point is below a second threshold. Further, the switching may be triggered if a radio link between the UE and the access point fails.

For each of the target access points, the message may further indicate information to be used by the UE for connecting to this target access point. For example, this may include a information on radio configuration, access parameters, radio resources, a cell-specific temporary identifier to be used by the UE, or the like. Further, the message may indicate a priority order of the target access points.

Further, the access point may send, to each of the plurality of target access points, information related to the UE. This information may be used by the target access points to prepare for a potential switching of the connection. As explained above, this information may in particular include a context of the UE, as used for maintaining the ongoing connection between the UE and the wireless communication network. As an alternative, the access point may also send such information after switching of the connection to one or more of the plurality of target access points. In such cases, the access point may receive a request from the target access point to which the connection was switched and send the information related to the UE in response to the request to this target access point.

Figure 5:
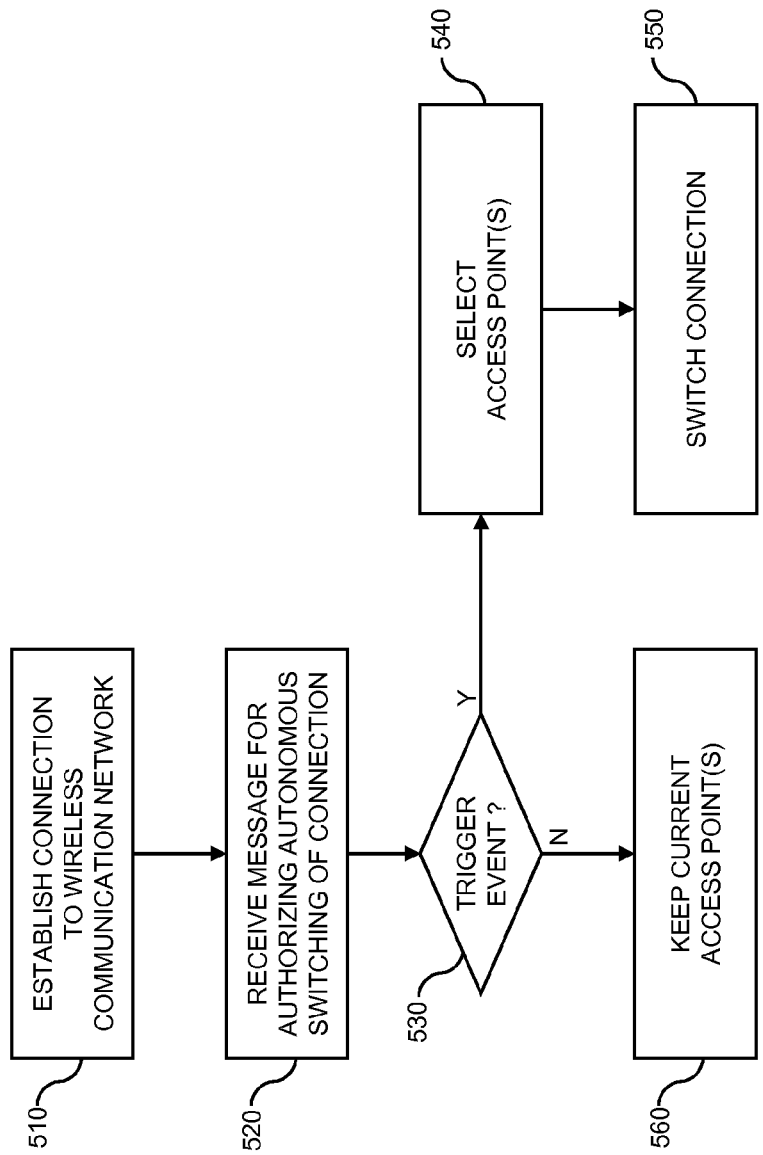
FIG. 5 shows a flowchart for illustrating a method according to an embodiment of the invention, which may be used for implementing functionalities for connection switching according to an embodiment of the invention in a UE.

FIG. 5 shows a flowchart for illustrating a method which may be used for implementing the above concepts in a UE, e.g., in the UE 50. If a processor based implementation of the UE is used, the steps of the method may be performed by one or more processors of the UE. For this purpose, the processor(s) may execute correspondingly configured program code. Further, at least some of the corresponding functionalities may be hardwired in the processor(s).

At step 510, establishes a connection to a wireless communication network, e.g., a wireless communication network using a deployment as explained in connection with FIG. 1. The connection is based on a radio link between the UE and an access point of the wireless communication network. In some scenarios, the connection may further be based on additional radio links between the UE and other access points.

At step 520, the UE receives a message from the access point which currently serves the connection. The message indicates a plurality of target access points and authorizes the UE to autonomously switch the connection to one or more of the target access points. As explained above, this autonomous switching does not require further interaction between the UE and the access point. The above-mentioned switching authorization messages 204 and 304 are examples of such message. In some scenarios, the UE may receive the message in response to establishing the connection between the UE and the communication network.

For each of the target access points, the message may further indicate information to be used by the UE for connecting to this target access point. For example, this may include a information on radio configuration, access parameters, radio resources, a cell-specific temporary identifier to be used by the UE, or the like. Further, the message may indicate a priority order of the target access points.

At step 530, the UE determines whether a triggering event occurred. If a triggering event occurred, the method continues with steps 540 and 550, as indicated by branch "Y". If no triggering event occurred, the method continues with step 560, as indicated by branch "N".

The triggering event may be based on a quality of a radio link between the UE and the target access points indicated in the message, as measured by the UE. The triggering event may also be based on a quality of a radio link between the UE and the access point, as measured by the UE. For example, the triggering event may correspond to a radio link quality expected for one of the target access points exceeding a radio link quality of the access point by a given amount. Further, the triggering event may correspond to a radio link quality expected for one of the target access points being above a first threshold and a radio link quality of the access point being below a second threshold. Further, the triggering event may correspond to failure of a radio link between the UE and the access point or interruption of the connection. The message of step 520 may also indicate a condition to be evaluated by the UE for triggering the switching to the target access point(s) and the triggering event may be based on said indicated condition.

At step 540, the UE may select one or more target access points from the plurality of target access points indicated in the message of step 520. This may be accomplished on the basis of information indicated in the message of step 520. For example, the message may indicate, a priority order of the target access points, and the UE may determine select the target access points depending on the indicated priority order. Alternatively, also more complex selection policies may be applied by the UE and may also be indicated in the message, e.g., selection policies which are based on measurements performed by the UE.

At step 550, the UE switches the connection to the target access point(s) selected at step 540. This may be accomplished on the basis of information indicated in the message of step 520. In particular, the message may indicate, for each of the indicated target access points, information to be used by the UE for connecting to this target access point, and the UE may performs the switching on the basis of this indicated information. In some scenarios, after switching to the target access point, the UE may also indicate information related to the access point, e.g., an identity of the access point, to this target access point. If this target access point becomes the new serving access point for the UE, it may use this information for obtaining information related to the UE from the previous serving access point.

At step 560, if no triggering event was detected at step 530, the UE may keep the current access point(s) for maintaining the connection.

It is to understood that the methods of FIGS. 4 and 5 may be used in combination, e.g., in a system formed of a UE, which operates according to the method of FIG. 5, and an access point currently serving the UE, which operates according to the method of FIG. 4.

Figure 6:
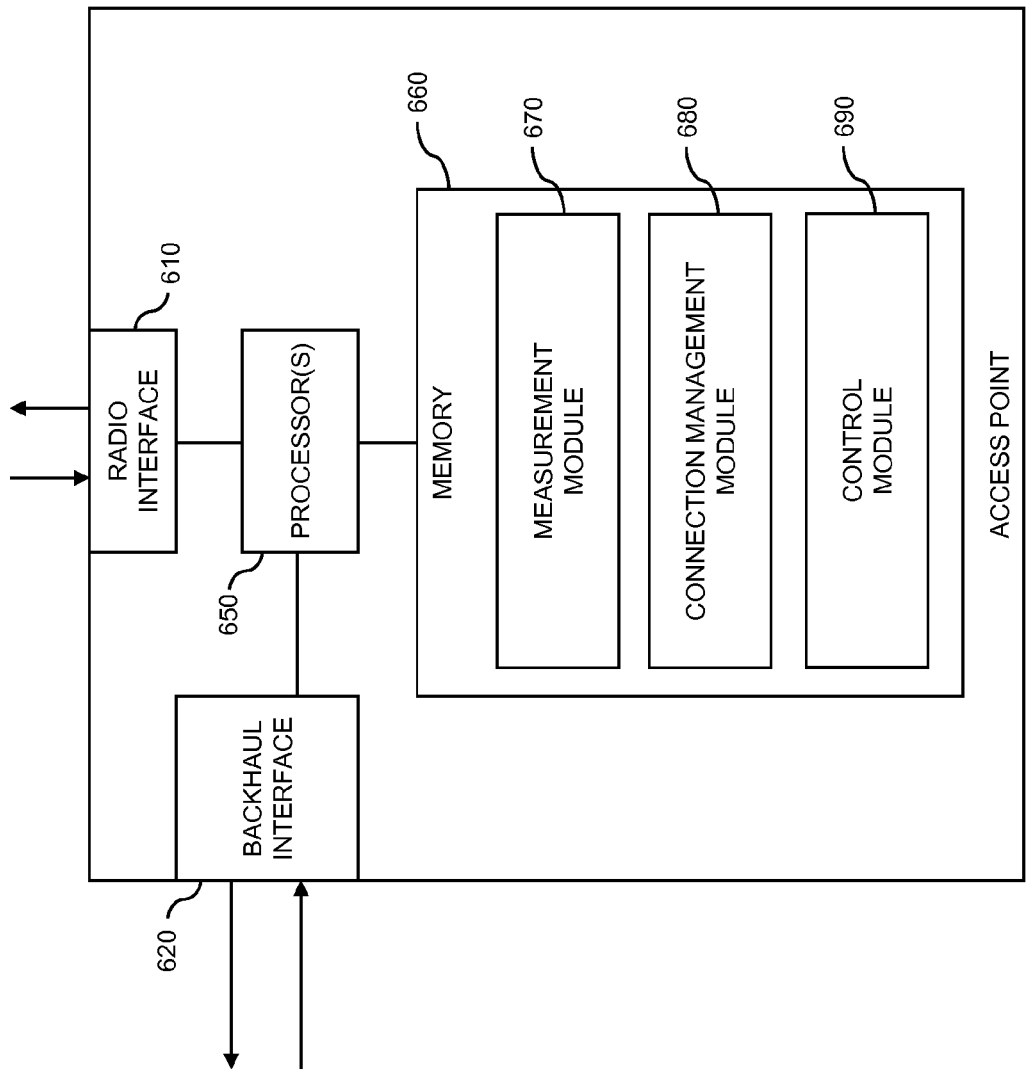
FIG. 6 schematically illustrates exemplary structures of an access point according to an embodiment of the invention.

FIG. 6 illustrates exemplary structures of an access point for a wireless communication network which may be used to implement the above concepts. For example, the illustrated structures may be used to implement the above-described functionalities of the access point 100-1 which currently serves the connection between the UE 50 and the wireless communication network.

In the illustrated example, the access point includes a radio interface 610 which may be used for serving a connection between the wireless communication network and a UE. Further, the access point may include a backhaul interface 620 which may be used for communication with other nodes of the wireless communication network, e.g., other access points or gateway nodes.

Further, the access point includes one or more processor(s) 650 coupled to the interfaces 610 and 620, and a memory 660 coupled to the processor(s) 650. The memory 660 may include a read-only memory (ROM), e.g., a flash ROM, a RAM, e.g., a dynamic RAM (DRAM) or static RAM (SRAM), a mass storage, e.g., a hard disk or solid state disk, or the like. The memory 660 includes suitably configured program code modules to be executed by the processor(s) 650 so as to implement the functionalities as described in connection with the method of FIG. 4, in particular functionalities as explained above for the access node 100-1. More specifically, the program code modules in the memory 660 may include a measurement module 670 so as to implement the above-described functionalities of performing measurements for triggering the sending of the switching authorization message or for determining the target access points indicated in the switching authorization message. Further, the program code modules in the memory 660 may include a connection management module 680 so as to implement the above-mentioned functionalities of serving a the connection between the UE and the wireless communication network, selecting target access points or handling communication with such target access points, and sending the switching authorization message. Still further, the memory 660 may include a control module 690 so as to implement general control functionalities, such as control of the radio interface, processing messages, controlling forwarding of data, or the like.

It is to be understood that the structures as illustrated in FIG. 6 are merely schematic and that the access point may actually include further components which, for the sake of clarity, have not been illustrated, e.g., further interfaces or further processors. Also, it is to be understood that the memory 660 may include further types of program code modules, which have not been illustrated, e.g., program code modules for implementing known functionalities of an access point. In some implementations, also a computer program may be provided for implementing functionalities of the access point, e.g., in the form of a physical medium storing the program code modules to be stored in the memory 660 or by making such program code available for download.

Figure 7:
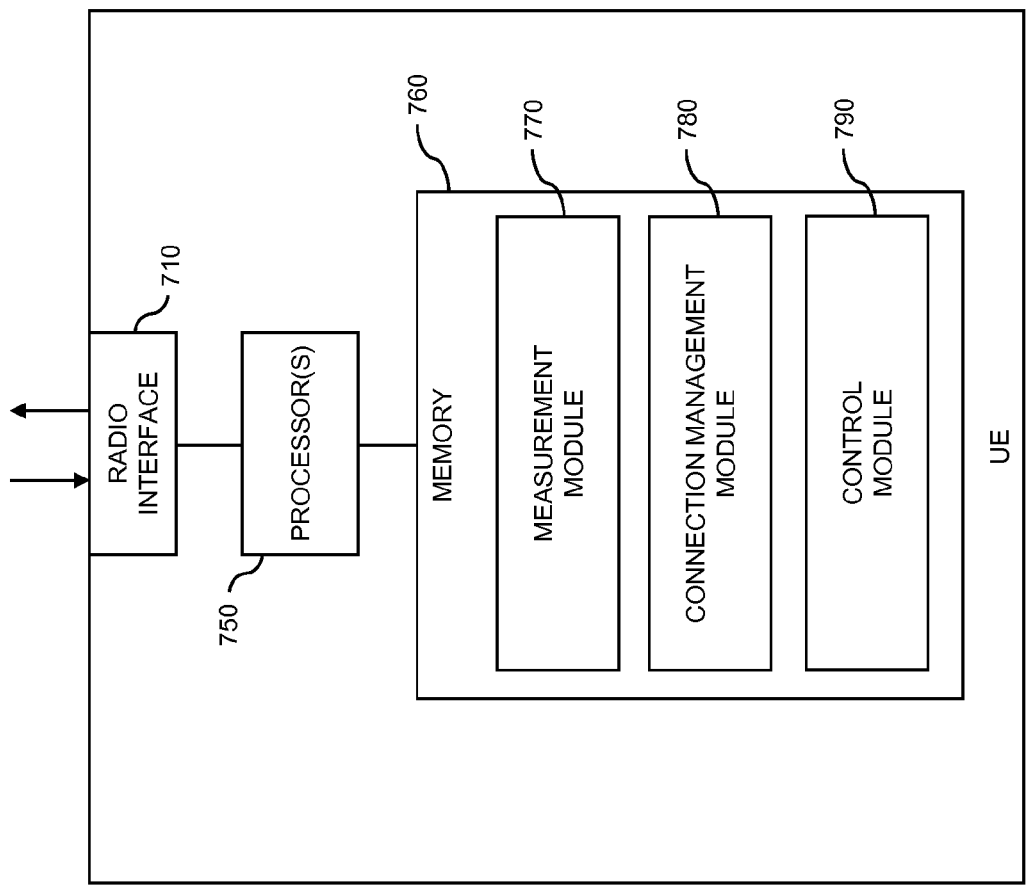
FIG. 7 schematically illustrates exemplary structures of a UE according to an embodiment of the invention.

FIG. 7 illustrates exemplary structures of a UE which may be used to implement the above concepts. For example, the illustrated structures may be used to implement the above-described functionalities of the UE 50.

In the illustrated example, the UE includes a radio interface 710 which may be used for establishing a connection to a wireless communication network.

Further, the UE includes one or more processor(s) 750 coupled to the interfaces 710 and 720, and a memory 760 coupled to the processor(s) 750. The memory 760 may include a ROM, e.g., a flash ROM, a RAM, e.g., a DRAM or SRAM, a mass storage, e.g., a hard disk or solid state disk, or the like. The memory 760 includes suitably configured program code modules to be executed by the processor(s) 750 so as to implement the functionalities as described in connection with the method of FIG. 5, in particular functionalities as explained above for the UE 50. More specifically, the program code modules in the memory 760 may include a measurement module 770 so as to implement the above-described functionalities of performing measurements for triggering the switching or selecting a target access point among multiple candidates. Further, the program code modules in the memory 760 may include a connection management module 780 so as to implement the above-mentioned functionalities of maintaining the connection between the UE and the wireless communication network, selecting a target access point, and performing the switching of the connection as authorized by the switching authorization message. Still further, the memory 760 may include a control module 790 so as to implement general control functionalities, such as control of the radio interface, processing control messages, or the like.

It is to be understood that the structures as illustrated in FIG. 7 are merely schematic and that the UE may actually include further components which, for the sake of clarity, have not been illustrated, e.g., further interfaces or further processors. Also, it is to be understood that the memory 760 may include further types of program code modules, which have not been illustrated, e.g., program code modules for implementing known functionalities of a UE. In some implementations, also a computer program may be provided for implementing functionalities of the UE, e.g., in the form of a physical medium storing the program code modules to be stored in the memory 760 or by making such program code available for download.

As can be seen, the concepts as described above may be used for efficiently managing the connection of the UE to the wireless communication network. In particular, by authorizing the UE to autonomously switch the connection to one or more from a plurality of target access points, it becomes possible to perform the connection switching even if the radio link between the UE and the current serving access point of the UE fails.

It is to be understood that the examples and embodiments as explained above are merely illustrative and susceptible to various modifications. For example, the illustrated concepts could be used in connection with various types of wireless communication networks, without limitation to the UDN technology used in the above-described exemplary implementations. Moreover, it is to be understood that the above concepts may be implemented by using correspondingly designed software to be executed by one or more processors of an existing device, or by using dedicated device hardware.

The invention claimed is:

1. A method of managing a connection between a user equipment (UE) and a wireless communication network, the method comprising:
    forming the connection between the UE and the wireless communication network, the connection comprising a radio link between the UE and an access point of the wireless communication network, wherein the access point of the wireless communication network serves the connection to the UE;
    the access point determining a plurality of target access points;
    the access point sending to the UE:
        a message comprising target information indicating said plurality of target access points and a UE-specific authorization authorizing the UE to autonomously switch the connection comprising the radio link between the UE and the access point to one or more of the plurality of target access points; and
        a condition to be evaluated by the UE for triggering the switch of the connection comprising the radio link between the UE and the access point to the one or more of the plurality of target access points; and
        wherein the access point sends, prior to the condition to be evaluated occurring, to each of the plurality of target access points, preparation information related to the UE for preparing a receiving target access point for a potential switching of the connection by the UE according to the condition;
    wherein the message comprises a first indication of a time period in which the UE is authorized to autonomously switch the connection; and wherein the preparation information comprises a second indication of a time period in which the UE is authorized to autonomously switch the connection.

2. The method according to claim 1, wherein the sending comprises sending the message with the UE-specific authorization, the target information, and the condition.

3. The method according to claim 2,
wherein the message further indicates, for each of the target access points, connection information to be used by the UE for connecting to this target access point.

4. The method according to claim 2,
wherein the message further indicates a priority order of the target access points.

5. The method of claim 2, wherein the message comprises multiple conditions to be evaluated by the UE for triggering the switch of the connection to the one or more of the plurality of target access points.

6. The method of claim 5, wherein the multiple conditions comprise a failure or interruption of the connection to the access point sending the UE-specific authorization.

7. The method of claim 5, wherein the multiple conditions comprises a threshold for a radio link quality.

8. The method according to claim 1, comprising:
the access point sending the UE-specific authorization in response to establishing the connection between the UE and the communication network.

9. The method according to claim 1, comprising:
the access point determining a failure probability of a radio link between the UE and the access point; and
the access point sending the UE-specific authorization in response to the failure probability being above a threshold.

10. The method according to claim 1, comprising:
the access point measuring a quality of a radio link between the UE and the access point; and
the access point sending the UE-specific authorization in response to the quality of the radio link being below a threshold.

11. The method according to claim 1, comprising:
the access point measuring a velocity of the UE; and
the access point sending the UE-specific authorization in response to the velocity being above a threshold.

12. The method according to claim 1, comprising:
after switching of the connection to one or more of the plurality of target access points, the access point receiving a request from this target access point; and
in response to the request, the access point sending additional information related to the UE to this target access point.

13. The method of claim 1, wherein the UE-specific authorization and the condition are in separate messages.

14. The method of claim 1, selectively sending the UE-specific authorization in response to network conditions.

15. The method of claim 1, wherein the preparation information comprises forwarded user plane data destined to the UE.

16. A method of managing a connection between a user equipment (UE) and a wireless communication network, the method comprising:
forming the connection between the UE and the wireless communication network, the connection comprising a radio link between the UE and an access point of the wireless communication network, wherein the access point of the wireless communication network serves the connection to the UE;
a UE receiving from the access point:
a message comprising target information indicating a plurality of target access points and a UE-specific authorization authorizing the UE to autonomously switch the connection comprising the radio link between the UE and the access point to one or more of the plurality of target access points; and
a condition to be evaluated by the UE for triggering the switch of the connection comprising the radio link between the UE and the access point to the one or more of the plurality of target access points;
the UE detecting a triggering event in accordance with evaluating the condition; and
in response to detecting the triggering event, the UE switching the connection to one or more of the plurality of target access points, wherein each of the plurality of target access points received preparation information, prior to the condition to be evaluated by the UE occurring, related to the UE for preparing a receiving target access point for a potential switching of the connection by the UE according to the condition;
wherein the message comprises a first indication of a time period in which the UE is authorized to autonomously switch the connection; and
wherein the preparation information comprises a second indication of a time period in which the UE is authorized to autonomously switch the connection.

17. The method according to claim 16,
wherein the triggering event is based on a quality of a radio link between the UE and said one or more of the plurality of target access points, as measured by the UE.

18. The method according to claim 16,
wherein the triggering event is based on a quality of a radio link between the UE and the access point, as measured by the UE.

19. The method according to claim 16, wherein the triggering event comprises an interruption of the connection.

20. The method according to claim 16, wherein the receiving comprises receiving the message with the UE-specific authorization, the target information, and the condition.

21. The method according to claim 20,
wherein the message further indicates, for each of the indicated target access points, connection information to be used by the UE for connecting to this target access point, and
wherein the UE performs the switching to said one or more of the plurality of target access points on the basis of the indicated information.

22. The method according to claim 20,
wherein the message further indicates a priority order of the target access points, and
wherein the UE determines said one or more of the plurality of target access points depending on the indicated priority order.

23. The method according to claim 16, comprising:
the UE receiving the message in response to establishing the connection between the UE and the communication network.

24. The method of claim 20, wherein the message comprises multiple conditions to be evaluated by the UE for triggering the switch of the connection to the one or more of the plurality of target access points.

25. The method according to claim 16, comprising:
after switching to said one or more of the plurality of target access points, the UE indicating access point information related to the access point to this target access point.

26. An access point for a wireless communication network, the access point comprising:
a radio interface configured to serve a connection to a user equipment (UE), the connection comprising a radio link between the UE and the access point of the wireless communication network; and
at least one processor, the at least one processor being configured to:
form the connection between the UE and the wireless communication network;
determine a plurality of target access points; and
send to the UE:
a message comprising target information indicating said plurality of target access points and a UE-specific authorization authorizing the UE to autonomously switch the connection comprising the radio link between the UE and the access point to one or more of the plurality of target access points; and
a condition to be evaluated by the UE for triggering the switch of the connection comprising the radio link between the UE and the access point to the one or more of the plurality of target access points; and
wherein the access point sends, prior to the condition to be evaluated occurring, to each of the plurality of target access points, preparation information related to the UE for preparing a receiving target access point for a potential switching of the connection by the UE according to the condition;
wherein the message comprises a first indication of a time period in which the UE is authorized to autonomously switch the connection; and
wherein the preparation information comprises a second indication of a time period in which the UE is authorized to autonomously switch the connection.

27. The access point according to claim 26,
wherein the at least one processor being configured to send the UE-specific authorization, the target information, and the condition in the message.

28. The access point according to claim 27,
wherein the message further indicates, for each of the target access points, connection information to be used by the UE for connecting to this target access point.

29. The access point according to claim 27,
wherein the message further indicates a priority order of the target access points.

30. The access point according to claim 26,
wherein the at least one processor is configured to send the message in response to establishing the connection between the UE and the communication network.

31. The access point according to claim 26,
wherein the at least one processor is configured to:
determine a failure probability of a radio link between the UE and the access point, and
send the UE-specific authorization in response to the failure probability being above a threshold.

32. The access point according to claim 26,
wherein the at least one processor is configured to:
measure a quality of a radio link between the UE and the access point; and
send the UE-specific authorization in response to the quality of the radio link being below a threshold.

33. The access point according to claim 26, wherein the at least one processor is configured to:
measure a velocity of the UE; and
send the UE-specific authorization in response to the velocity being above a threshold.

34. The access point according to claim 26,
wherein the at least one processor is configured to send the message in response to determining that a further plurality of target access points, which was previously indicated to the UE, is no longer valid.

35. The access point according to claim 26,
wherein the at least one processor is configured to:
after switching of the connection to one or more of the plurality of target access points, receive a request from this target access point, and
in response to the request, send additional information related to the UE to this target access point.

36. A user equipment (UE), comprising:
a radio interface configured to establish a connection to a wireless communication network; and
at least one processor, the at least one processor being configured to:
form the connection between the UE and the wireless communication network, the connection comprising a radio link between the UE and an access point of the wireless communication network, wherein the access point of the wireless communication network serves the connection between the UE and the wireless communication network;
receive from the access point:
a message comprising target information indicating a plurality of target access points and an authorization authorizing the UE to autonomously switch the connection comprising the radio link between the UE and the access point to one or more of the plurality of target access points; and
a condition to be evaluated by the UE for triggering the switch of the connection comprising the radio link between the UE and the access point to the one or more of the target access points;
detect a triggering event in accordance with evaluating the condition; and
in response to detecting the triggering event, switch the connection to one or more of the plurality of target access points, wherein each of the plurality of target access points received preparation information, prior to the condition to be evaluated by the UE occurring, related to the UE for preparing a receiving target access point for a potential switching of the connection by the UE according to the condition;
wherein the message comprises a first indication of a time period in which the UE is authorized to autonomously switch the connection; and
wherein the preparation information comprises a second indication of a time period in which the UE is authorized to autonomously switch the connection.

37. The UE according to claim 36,
wherein the triggering event is based on a quality of a radio link between the UE and said one or more of the plurality of target access points, as measured by the UE.

38. The UE according to claim 36,
wherein the triggering event is based on a quality of a radio link between the UE and the access point, as measured by the UE.

39. The UE according to claim 36, wherein the triggering event comprises an interruption of the connection.

40. The UE according to claim 36, wherein the at least one processor is configured to receive the UE-specific authorization, the target information, and the condition in the message.

41. The UE according to claim 40,
wherein the message further indicates, for each of the indicated target access points, connection information to be used by the UE for connecting to this target access point, and
wherein the at least one processor is configured to perform the switching to said one or more of the plurality of target access points on the basis of the indicated information.

42. The UE according to claim 40,
wherein the message further indicates a priority order of the target access points; and
wherein the at least one processor is configured to determine said one or more of the plurality of target access points depending on the indicated priority order.

43. The UE according to claim 36, wherein the at least one processor is configured to receive the message in response to establishing the connection between the UE and the communication network.

44. The UE according to claim 36, wherein the at least one processor is configured to indicate, after switching to said one or more of the plurality of target access points, access point information related to the access point to this target access point.

* * * * *

UNITED STATES PATENT AND TRADEMARK OFFICE
CERTIFICATE OF CORRECTION

PATENT NO. : 10,945,181 B2  
APPLICATION NO. : 15/114163  
DATED : March 9, 2021  
INVENTOR(S) : Zhang et al.

Page 1 of 1

It is certified that error appears in the above-identified patent and that said Letters Patent is hereby corrected as shown below:

In the Specification

In Column 4, Lines 25-26, delete "UMTS (Universal Terrestrial Mobile Telecommunications System)" and insert -- UMTS (Universal Mobile Telecommunications System) --, therefor.

In Column 4, Line 63, delete "100-2, 100-3," and insert -- 100-1, 100-2, --, therefor.

In Column 7, Line 13, delete "100-2, 100-2," and insert -- 100-2, --, therefor.

In Column 10, Line 25, delete "100-2, 100-2," and insert -- 100-2, --, therefor.

In Column 10, Line 44, delete "100-4, 100-5," and insert -- 100-4, --, therefor.

In Column 13, Line 7, delete "a" and insert -- an --, therefor.

In Column 14, Line 20, delete "determine" and insert -- determine to --, therefor.

In Column 15, Line 15, delete "a the" and insert -- the --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*